US007081814B2

(12) United States Patent
Kawabe et al.

(10) Patent No.: US 7,081,814 B2
(45) Date of Patent: Jul. 25, 2006

(54) CHANGE DETECTING METHOD AND APPARATUS AND MONITORING SYSTEM USING THE METHOD OR APPARATUS

(75) Inventors: Tsuyoshi Kawabe, Tokyo (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 37 days.

(21) Appl. No.: 10/863,485

(22) Filed: Jun. 9, 2004

(65) Prior Publication Data

US 2004/0246123 A1 Dec. 9, 2004

(30) Foreign Application Priority Data

Jun. 9, 2003 (JP) ............................ 2003-163918
Sep. 29, 2003 (JP) ............................ 2003-338676

(51) Int. Cl.
*G08B 1/08* (2006.01)
*H04Q 7/00* (2006.01)

(52) U.S. Cl. ............ 340/539.25; 340/506; 340/539.18; 348/143; 382/103

(58) Field of Classification Search ........... 340/539.25, 340/539.18, 506
See application file for complete search history.

(56) References Cited

U.S. PATENT DOCUMENTS 5,412,708 A * 5/1995 Katz ....................... 348/14.05
6,445,409 B1 9/2002 Ito et al. ...................... 348/155
6,466,258 B1 * 10/2002 Mogenis et al. ............ 348/143
6,496,592 B1 * 12/2002 Lanini ......................... 382/103
6,587,046 B1 * 7/2003 Joao ...................... 340/539.14

FOREIGN PATENT DOCUMENTS

JP 2001/169270 6/2001
JP 2001/283225 10/2001

* cited by examiner

*Primary Examiner*—Donnie L. Crosland
(74) *Attorney, Agent, or Firm*—Mattingly, Stanger, Malur & Brundidge, P.C.

(57) ABSTRACT

A change detecting apparatus and monitoring system using the apparatus as a notification apparatus. The change detecting apparatus has an input unit receiving a monitor image captured by a pickup unit, a region specification unit specifying N regions (N≧2) in the monitor image, a notification destination specification unit specifying notification destinations of image changes in the monitor image in advance according to the image change characteristics, a change detection unit detecting an image change in the N regions, a characteristics extraction unit extracting a feature of the image change, a monitor information generation unit generating monitor information related to the detected image change and a transmission unit transmitting the monitor information. Based on the detected image change characteristics, the monitor information is transmitted to a notification destination set in the notification destination specification unit.

18 Claims, 14 Drawing Sheets

| | | | | | | | | | | | | | | | |
|---|---|---|---|---|---|---|---|---|---|---|---|---|---|---|---|
| | | | | | | | | | | | | | | | |
| | | | | 1 | 1 | 1 | 1 | 1 | 1 | | | | | | |
| | | | | 1 | 1 | 1 | 1 | 1 | 1 | | | | | | |
| | | | | 1 | 1 | 1 | 1 | 1 | 1 | | 2 | 2 | 2 | 2 | |
| | | | | 1 | 1 | 1 | 1 | 1 | 1 | | 2 | 2 | 2 | 2 | |
| | | | | | | | | | | | 2 | 2 | 2 | 2 | |
| | | | | | | | | | | | 2 | 2 | 2 | 2 | |
| | | | | | | | | | | | 2 | 2 | 2 | 2 | |
| | | | | | | | | | | | 2 | 2 | 2 | 2 | |
| | | | | | | | | | | | | | | | |
| | | | | | | | | | | | | | | | |
| | | | | | | | | | | | | | | | |

FIG. 3

| REGION NUMBER | NOTIFICATION DESTINATION |
| --- | --- |
| REGION 1 | 1st-bldg-front@abc.co.jp<br>FRONT DESK OF 1st BUILDING |
| REGION 2 | guardroom@abc.co.jp<br>GUARDROOM |

FIG. 5A

NOTIFICATION DESTINATION TABLE FOR MONITOR REGION (1)

| No. OF BLOCKS IN WHICH CHANGE WAS DETECTED | NOTIFICATION DESTINATION |
|---|---|
| LESS THAN 6 | - |
| 6 OR MORE BUT LESS THAN 12 | 1st-bldg-front@abc.co.jp<br>FRONT DESK OF 1st BUILDING |
| 12 OR MORE | 1st-bldg-carpark-attendt@abc.co.jp<br>CAR PARK ATTENDANT IN 1st BUILDING |

FIG. 5B

NOTIFICATION DESTINATION TABLE FOR MONITOR REGION (2)

| No. OF BLOCKS IN WHICH CHANGE WAS DETECTED | NOTIFICATION DESTINATION |
|---|---|
| LESS THAN 6 | - |
| 6 OR MORE | guardroom@abc.co.jp<br>GUARDROOM |

FIG. 15A

| DETECTION TIME | NOTIFICATION DESTINATION |
| --- | --- |
| 0:00～9:00 | - |
| 9:00～17:00 | 1st-bldg-front@abc.co.jp<br>FRONT DESK OF 1st BUILDING |
| 17:00～24:00 | - |

FIG. 15B

| DETECTION TIME | NOTIFICATION DESTINATION |
| --- | --- |
| 0:00～24:00 | guardroom@abc.co.jp<br>GUARDROOM |

CHANGE DETECTING METHOD AND APPARATUS AND MONITORING SYSTEM USING THE METHOD OR APPARATUS

The present application claims priorities from Japanese patent applications JP2003-163918 filed on Jun. 9, 2003 and JP2003-338676 filed on Sep. 29, 2003, the contents of which are hereby incorporated by reference herein.

CROSS-REFERENCE TO RELATED APPLICATIONS

This application relates to the subject matters of the following U.S. patent applications.

U.S. patent application Ser. No. 10/820,031 (Applicants' Ref.: US11476 (W1405-01EJ) assigned to the same assignee of the present invention and filed on Apr. 8, 2004 in the names of Tsuyoshi Kawabe, Hirotada Ueda and Kazuhito Yaegashi and entitled "Video Distribution Method and Video Distribution System", the disclosure of which is hereby incorporated by reference herein.

U.S. patent application Ser. No. 10/840,366 (Applicants' Ref.: US11480 (W1503-10EJ) assigned to the same assignee of the present invention and filed on May 7, 2004 in the names of Tsuyoshi Kawabe and Hirotada Ueda and entitled "Change Detecting Method and Apparatus", the disclosure of which is hereby incorporated by reference herein.

BACKGROUND OF THE INVENTION

The present invention relates to a change detecting technology for detecting and notifying the generation of an image change, and more particularly to a change detecting method and apparatus and a monitoring system using the method or apparatus that transmits monitor information, generated by detecting the generation of an image change in a monitoring system, to PCs (Personal Computer) or portable or mobile terminals connected via a network.

In recent years, video accumulation and video distribution technologies using the network technology of the Internet or a LAN have been developed for use in monitoring intruders using a monitor camera. Techniques have also been developed for accumulating images as digital data in a storage unit such as a hard disk or a DVD (Digital Versatile Disk).

A technology for detecting a change in an image captured by a monitor camera using the image recognition technology and for sending information on the change to a PC or a portable terminal connected to a network as the monitor information is disclosed, for example, in Japanese Patent Application No. JP2002-347202. Further, a monitor information transmission technology for specifying monitor schedules and monitor regions by providing a table for holding parameters for the times and regions is disclosed in U.S. patent application Ser. No. 10/840,366 (Applicant's Ref.: US11480 (W1503-01EJ)) and its corresponding Korean patent application No. 2004099144A (Applicant's Ref.: KR61199(W1503-02EJ))(claiming priority from JP-A-2003-139179).

An image recognition technology is also known that traces the moving direction of a moving object by detecting an image change, calculating the size of the moving object and its center of gravity, and continuously processing them for a plurality of frames. For example, see U.S. Pat. No. 6,445,409.

SUMMARY OF THE INVENTION

According to conventional monitor information transmission technologies, the notification destination to which monitor information detected at abnormality time is to be sent is predetermined and there is no means for automatically changing the notification destination based on detected monitor information. To change the notification destination, the notification destination of the monitor information produced by the monitor information transmission technologies must be manually rewritten.

However, there is a need for transmitting monitor information, acquired from images captured by one monitor camera, to different notification destinations according to the location where a moving object is detected, the size of a moving object, or the combination of them.

It is an object of the present invention to provide a change detecting method and apparatus capable of transmitting monitor information to different notification destinations according to the location of a moving object, the size of a moving object, and so on.

It is another object of the present invention to provide a monitoring system having the above-described change detecting apparatus as a notification apparatus.

According to one aspect of the present invention, there is provided a change detecting apparatus comprising an input unit that receives a monitor image picked up by a pickup unit; a region specification unit that specifies N regions (N is a positive integer equal to or larger than 2) in the monitor image; a notification destination specification unit that specifies notification destinations of image changes in the monitor image in advance according to characteristics or features of the image changes; a change detection unit that detects an image change in each of the N regions; a characteristics extraction unit that extracts at least one characteristic or feature of the image changes from the change detection unit; a monitor information generation unit that generates monitor information related to each of the detected image changes; and a transmission unit that transmits the monitor information, wherein the transmission unit transmits the monitor information to a predetermined notification destination, which is set in the notification destination specification unit, based on the detected characteristic or feature of the image change.

In one embodiment, the characteristic or feature extracted by the characteristics extraction unit includes identification information on a region in which an image change was detected and monitor information related to the image change is transmitted to a predetermined notification destination based on the identification information.

In one embodiment, the characteristic extracted by the characteristics extraction unit further include size information on a region, in which the image change was detected, in addition to the identification information on the region, and monitor information related to the image change is transmitted to a predetermined notification destination based on the identification information and the size information on the region.

In one embodiment, the characteristic or feature extracted by the characteristics extraction unit include a moving direction of the image change in the monitor image, and monitor information related to the image change is transmitted to a predetermined notification destination based on the moving direction of the image change.

Although the term "monitor information" is used in this specification, the terms such as "alarm information" and "detection information" are equivalent and those terms are encompassed by the present invention. The "monitor information" is a generic term for information transmitted from a notification apparatus to other apparatuses but is not limited by the meaning of "monitor". The notification apparatus in this specification refers to a change detecting apparatus having a function to transmit information such as monitor information.

Although the term "monitoring system" is used in this specification, the terms such as "notification system" and "object detecting system" are equivalent and those terms are encompassed by the present invention.

Other objects, features, and advantages of the present invention will be made more apparent by the description of the embodiments of the present invention given below, taken in conjunction with the accompanying drawings.

BRIEF DESCRIPTION OF THE DRAWINGS

FIG. 3 is a diagram showing an example of a notification destination table used by a method for selecting the notification destination of monitor information in one embodiment of the present invention.

FIGS. 5A and 5B are diagrams showing examples of notification destination tables used to select the notification destination of monitor information in another embodiment of the present invention.

FIG. 15A is a diagram showing an example of the notification destination table, set up for monitor region (1), in which a time when an image change is detected is related to the notification destination of image information.

FIG. 15B is a diagram showing an example of the notification destination table, set up for monitor region (2), in which a time when an image change is detected is related to the notification destination of image information.

DESCRIPTION OF THE EMBODIMENTS

Figures 1, 2:
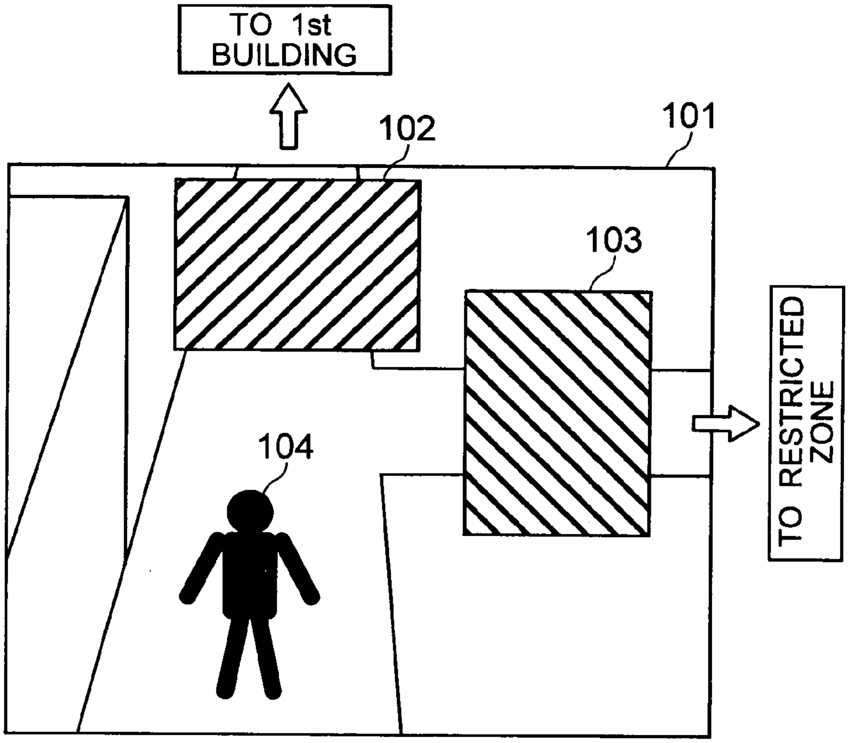
FIG. 1 is a diagram showing an example of an image, captured by a monitor camera, used to describe a method for selecting the notification destination of monitor information in one embodiment of the present invention.
FIG. 2 is a diagram showing an example of monitor regions set for the image captured by the monitor camera in FIG. 1.

Some embodiments of the present invention will be described with reference to the drawings. In the drawings, the same reference numerals denote the same structural elements.

First, referring to FIG. 10, a network monitoring system in one embodiment of the present invention will be described.

Figure 10:
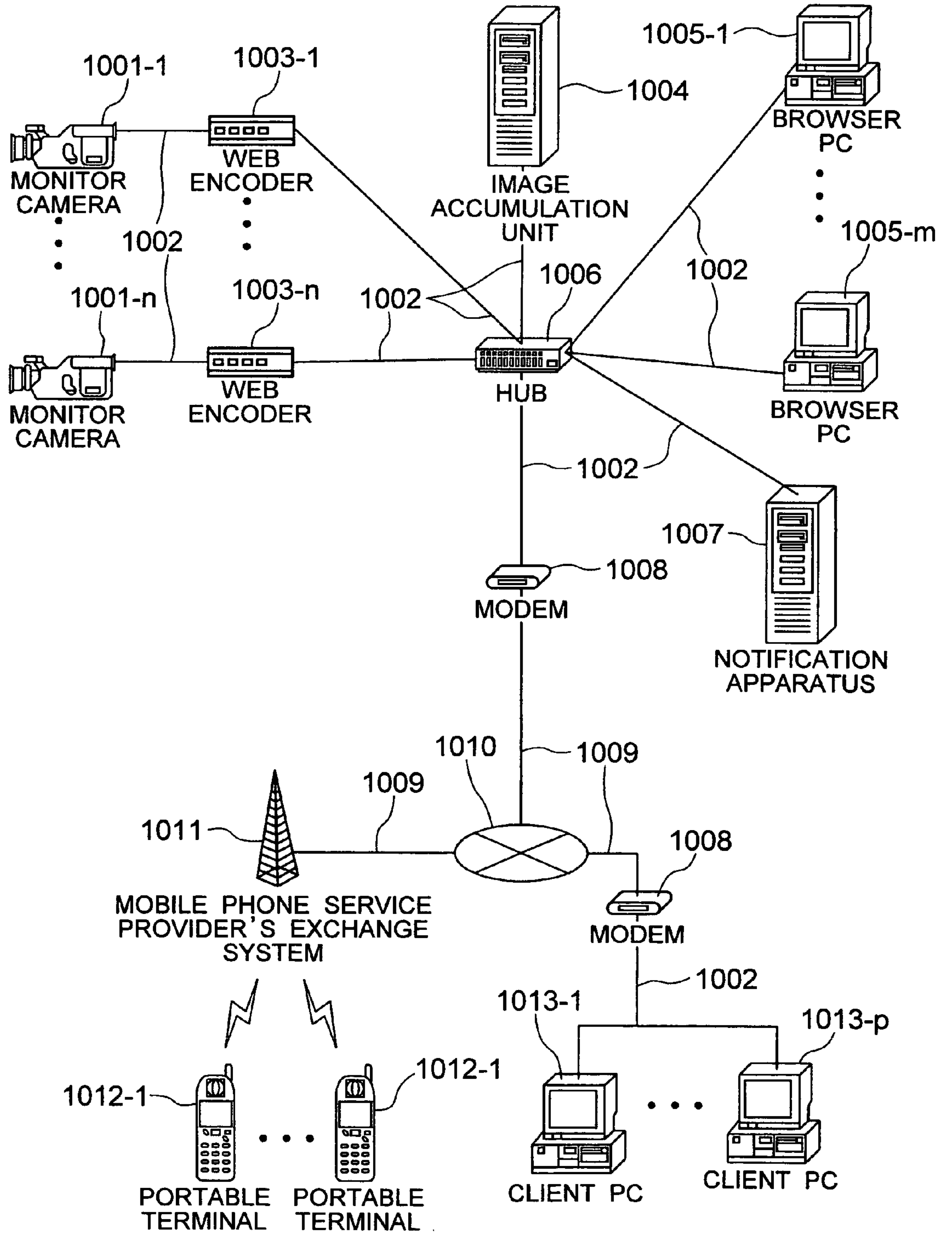
FIG. 10 is a diagram showing the configuration of a network monitoring system in one embodiment of the present invention.

FIG. 10 is a diagram showing the configuration of the network monitoring system used in the present invention.

In FIG. 10, the numerals 1001-1, 1001-2, . . . , 1001-*n* (n=1, 2, . . . ) indicate a plurality of monitor cameras (image pick up units). The numeral 1001 is used to collectively refer to monitor cameras. The other units in FIG. 10 are indicated in the same manner.

The numeral 1002 indicates a transmission path of video signals such as a LAN (Local Area Network), and the numerals 1003-1, 1003-2, . . . , 1003-*n* (n=1, 2, . . . ) indicate Web encoders. The numeral 1004 indicates an image accumulation unit having the function of accumulating the images from monitor cameras.

The numerals 1005-1, 1005-2, . . . , 1005-*m* (m=1, 2, . . . ) indicate browser PCs having the function of managing the whole monitoring system. The numeral 1006 indicates a hub, the numeral 1007 indicates a notification apparatus, the numeral 1008 indicates a modem, the numeral 1009 indicates a transmission path implemented by a public line, the numeral 1010 indicates a WAN (Wide Area Network) network such as the Internet, the numeral 1011 indicates a mobile phone service provider's exchange system, the numerals 1012-1, 1012-2, . . . , 1012-1 (l=1, 2, . . . ) indicate portable terminals, and the numerals 1013-1, 1013-2, . . . , 1013-*p* (p=1, 2, . . . ) indicate client PCs.

The configuration may have only one monitor camera and one Web encoder, or a plurality of monitor cameras may be connected to one Web encoder. It is also possible to use a unit in which the functions of the monitor camera, the Web encoder, the image accumulation unit, and notification apparatus are integrated. The system described with reference to FIG. 10 may also be implemented using an in-body LAN (Local Area Network) of a robot, an in-vehicle LAN of a car, or a network built within a unit of equipment.

The monitor camera 1001, Web encoder 1003, image accumulation unit 1004, hub 1006, notification apparatus 1007, modem 1008, and client PC 1013 are interconnected via the transmission path 1002 such as a LAN. The mobile phone service provider's exchange system 1011 is connected to the modem 1008 via the transmission path 1009 and the network 1010. The mobile phone service provider's exchange system 1011 is connected wirelessly to the portable terminal 1012.

Figure 11:
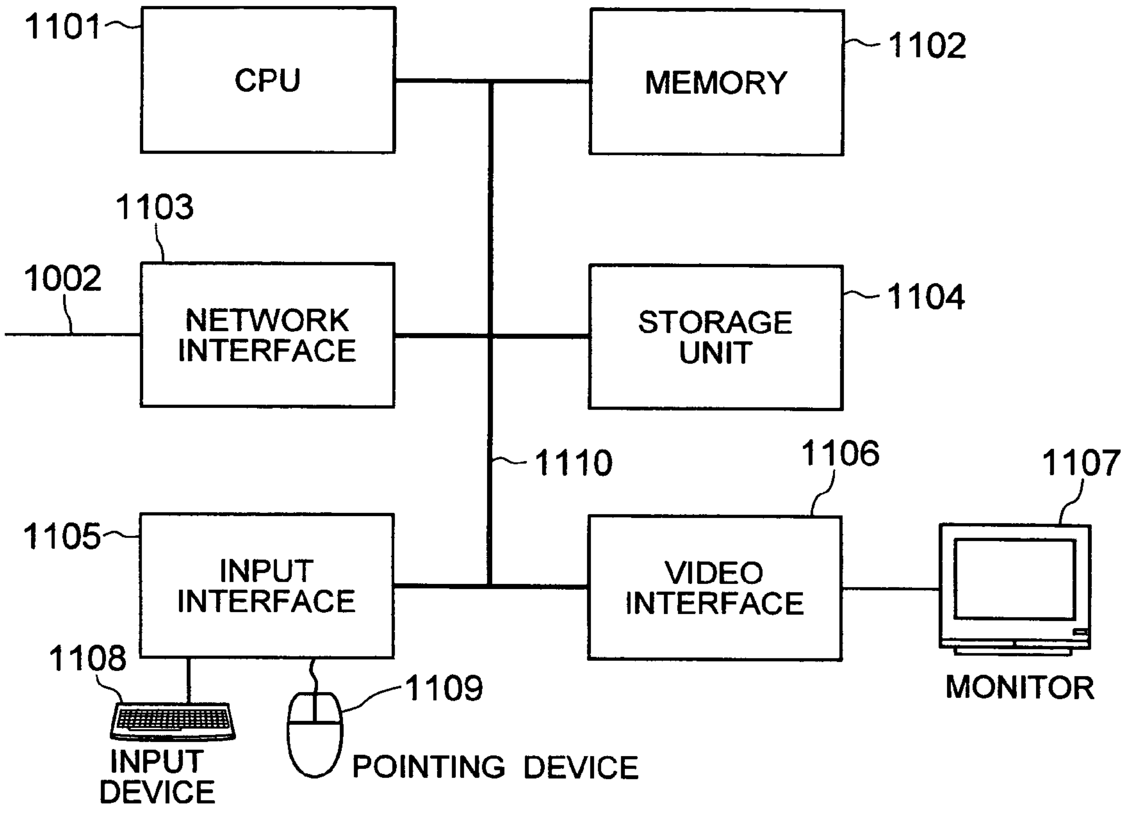
FIG. 11 is a block diagram showing the general configuration of the units of the monitoring system shown in FIG. 10.

FIG. 11 is a block diagram showing one embodiment of the general configuration of the image accumulation unit 1004, browser PC 1005, notification apparatus 1007, portable terminal 1012, and client PC 1013 used in the present invention. An example of the hardware configuration is shown here because, despite of a difference in the function of the installed software (operation program), the hardware configuration is similar. The numeral 1101 indicates a CPU (Central Processing Unit), the numeral 1102 indicates a memory in which the operation programs are stored, and the numeral 1103 indicates a network interface.

The numeral 1104 indicates a storage unit. The storage unit 1104, used as the storage unit of the image accumulation unit 1004 to record the images captured by the monitor camera 1001, uses a large-capacity recording medium, for example, a VTR. Random access recording media, such as a magnetic disk (HD: hard disk) and a DVD (Digital Versatile Disc), are also preferable. The numeral 1105 indicates an input interface, the numeral 1108 indicates an input device such as a keyboard, the numeral 1109 indicates a pointing device such as a mouse, the numeral 1106 indicates a video interface, the numeral 1107 indicates a monitor, and the numeral 1110 indicates a bus.

All the devices from the CPU 1101 to the video interface 1106 are interconnected via the bus 1110. The monitor 1107 is connected to the bus 1110 via the video interface 1106. The input device 1108 and the pointing device 1109 are connected to the bus 1110 via the input interface 1105. Also, the network interface 1103 is connected to the LAN transmission path 1002. In addition, the network interface 1103 may be connected to the transmission path 1009 of a public line as necessary. When the configuration in FIG. 11 is applied to the notification apparatus 1007, the network interface 1103 and the transmission path 1002 connected to it form the image input unit of the notification apparatus and receives images from the image accumulation unit 1004.

Assume that the monitor camera 1001 is installed at a predetermined monitor position. This monitor camera constantly picks up images, and the images thus picked up are accumulated in the image accumulation unit 1004 via the LAN transmission path 1002, Web encoder 1003, and hub 1006.

The notification apparatus 1007 has the function of retrieving an image from the image accumulation unit 1004 and comparing the image retrieved previously with the image retrieved immediately before and detects an image change. The notification apparatus 1007 thus has the function of detecting and accumulating an abnormality through the so-called image recognition technique. The technique of detecting an abnormality through image recognition technology is a well-known method for detecting a change in the brightness components of the preceding and following frame screens or for comparing the video signal spectra and, therefore, is not explained in detail.

If an image change is found as a result of comparison and an abnormality is detected, the notification apparatus 1007 determines that there is an abnormality and stores therein the image in which the abnormality is detected and the date/time at which the abnormality is detected, as well as a required message. At the same time, the notification apparatus 1007 selects the notification destination according to the contents of the change and delivers the information to the portable terminal 1012 and the client PC 1013, which are the notification destinations, as the monitor information. That is, the monitor information is distributed from the notification apparatus 1007, via the hub 1006, modem 1008, and network 1010, to the portable terminal 1012 via the mobile phone service provider's exchange system 1011 or to the client PC 1013 via the modem 1008. The message described above may be, for example, "Abnormality occurred: month/day/hour/minute/second".

Next, the notification apparatus (change detecting apparatus) 1007 will be described with reference to FIG. 9.

Figure 9:
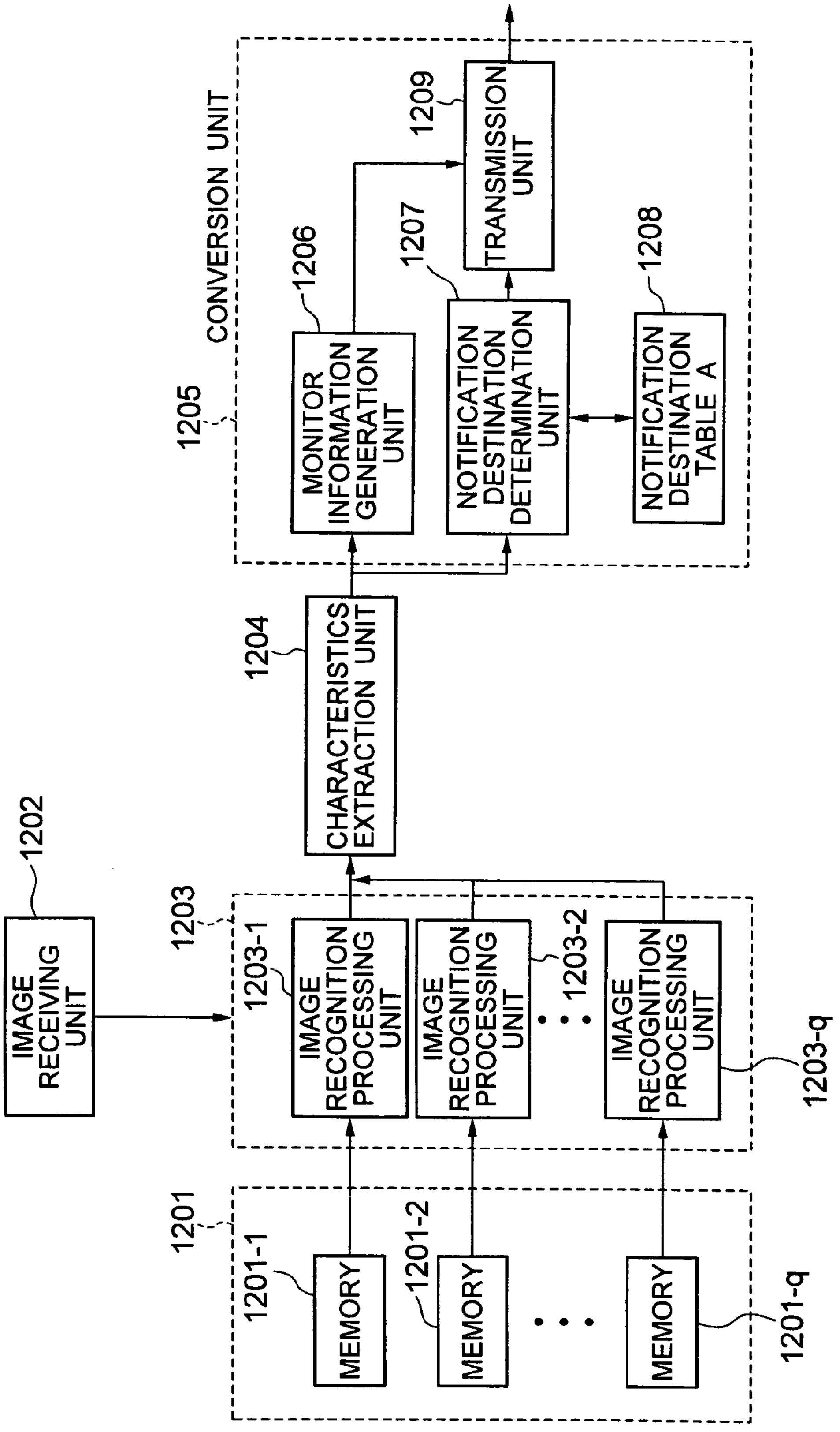
FIG. 9 is a block diagram showing the basic configuration of a notification apparatus in one embodiment of the present invention.

FIG. 9 is a block diagram showing the basic configuration of the notification apparatus 1007 according to the present invention that can handle a plurality of monitor regions and a plurality of notification destinations. The means for implementing the functions described below may be any circuit or device that can act as means for implementing the function. Further, a part of or whole of the functions may be implemented by software. The function implementation means may be implemented by a plurality of circuits, or a plurality of function implementation means may be implemented by a single circuit.

Referring to FIG. 9, a memory unit 1201 includes a plurality of memories, that is, memory 1201-1, memory 1201-2, . . . , memory 1201-*q* (q=1, 2, . . . ), each storing a region table in which a different monitor region is set. Here, the monitor region refers to a region of the whole area, picked up by an individual monitor camera, for which image recognition processing is performed. Note that the memory unit 1201 may be provided for each monitor camera. Alternatively, the memory unit 1201 may be in the form of a single memory unit that has a plurality of memories, one for each of all monitor regions of all monitor cameras.

An image receiving unit 1202 retrieves an image, captured by the monitor camera, from the image accumulation unit 1004 and outputs the retrieved image to a detection processing unit 1203.

The detection processing unit 1203 consists of a plurality of image recognition processing units, that is, image recognition processing unit 1203-1, image recognition processing unit 1203-2, . . . , image recognition processing unit 1203-*q* (q=1, 2, . . . ), and those image recognition processing units each read the region table stored in the memory 1201-1, memory 1201-2, . . . , and memory 1201-*q*.

The detection processing unit 1203 performs image processing for an image received from the image receiving unit 1202 based on the monitor region defined by the region table for detecting an intruding object. That is, the detection processing unit 1203 performs known image recognition processing only for a region of the area of the image picked up by the monitor camera for detecting an image change wherein the region is defined by each region table stored in the memory unit 1201. When an image change is detected, the changed part of the image, produced as the result of detection by the detection processing unit 1203, is output to a characteristics extraction unit (i.e. feature extraction unit) 1204. In the description below, the detected changed part of an image is treated as a monitor target.

Based on the detection result received from the detection processing unit 1203, the characteristics extraction unit 1204 detects the characteristics or features of the detected target and outputs them to a conversion unit 1205 as characteristic or feature information on the target. The characteristic or feature includes the size of the target, the shape of the target, the color of the target, the moving speed of the target, the direction into which the target moves, the region in which the target is detected, and so on. The characteristics extraction unit 1204 identifies whether the detected target is a person or a car and, if the target is a car, the color of that car. It is easily understood that other distinctions can also be made as necessary. The characteristics or feature information may also include the time of day, year/month/day at which the detection processing unit 1203 detected the image change, monitor camera number, and so on. It is to be understood that the characteristics or features need not always include all items described above but only the required number of required items need be included according to the monitor target and the monitor purpose. For the detection of the characteristics or features of a target, known technology in the art, for example, the technology disclosed by U.S. Pat. No. 6,445,409, can be used.

The conversion unit 1205, which consists of a monitor information generation unit 1206, a notification destination determination unit 1207, a transmission unit 1209, and a notification destination table A1208, generates monitor information, determines the notification destination, and transmits the monitor information based on the output result of the characteristics extraction unit 1204.

The monitor information generation unit 1206 generates monitor information based on the characteristics or feature information on the target received from the characteristics extraction unit 1204.

The notification destination determination unit 1207 searches the notification destination table A1208 based on the characteristics or feature information on the target received from the characteristics extraction unit 1204 to acquire the notification destination to which the monitor information to be transmitted. The notification destination table A1208 contains information on a location to which the monitor information is to be transmitted such as the mail address of the notification destination. The notification destination table A1208 also contains conditions for determining the notification destination. That is, the table contains in advance the notification destinations to be selected according to the monitor region in which the target is detected, the size of the target, and so on.

The transmission unit 1209 transmits the monitor information, generated as described above, to the notification destination determined by the notification destination determination unit 1207.

It is also possible to store the detection result of the detection processing unit 1203, the transmitted monitor information, and so on in the memory in the notification apparatus as a log.

The function of the notification apparatus 1007 shown in FIG. 9 can be implemented by the processing of the CPU 1101, memory 1102, network interface 1103, storage unit 1104, and so on described above. The image receiving unit corresponds to the transmission path 1002 and the network interface 1103 (FIG. 11).

Figure 12:
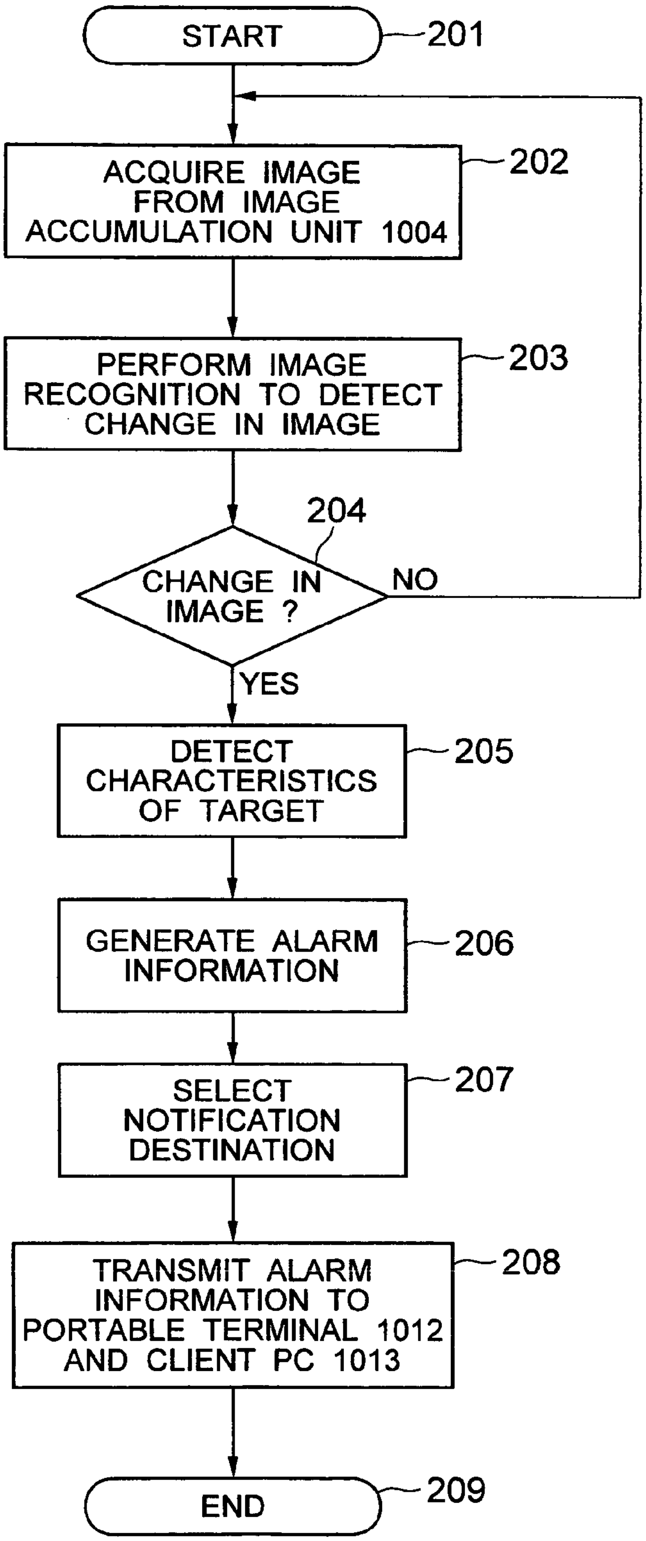
FIG. 12 is a flowchart showing the operation of the network monitoring system shown in FIG. 10 in one embodiment of the present invention.

An example of the operation of the monitoring system shown in FIG. 10 will be described with reference to the flowchart shown in FIG. 12. FIG. 12 is a flowchart describing the operation in which the notification apparatus 1007 detects an abnormality in an image accumulated in the image accumulation unit 1004 through detection of an image change and transmits monitor information to the portable terminal 1012 and the client PC 1013.

In step 201, the monitor operation, that is, the monitor operation of the monitoring system, is started. The Web encoder 1003 digitally compresses a monitor image from the predetermined monitor camera 1001 to generate image compression data. This image compression data is accumulated in the image accumulation unit 1004 via the hub 1006.

The image compression data stored in the image accumulation unit 1004 is a digitally compressed image stored with information such as the pickup date/time, the channel number of the monitor camera 1001, and the compression format. An image from which monitor camera is to be captured is determined in various ways; for example, the image to be captured is scheduled in advance by the management of the browser PC 1005 or is selected based on abnormality detection information.

In step 202, the image receiving unit 1202 of the notification apparatus 1007 acquires one frame of image from the image accumulation unit 1004. In this step, all images input from the monitor camera 1001 to the image accumulation unit 1004 are read in order of input and supplied to the image receiving unit 1202 of the notification apparatus 1007.

In step 203, the detection processing unit 1203 of the notification apparatus 1007 performs image recognition processing and compares the previous image with the current image received from the image receiving unit 1202, for example, in the brightness value, to detect an image change. As described above, the detection processing unit 1203 performs image recognition processing only for the monitor region defined by the region table stored in the memory unit 1201 to detect an image change in the monitor region.

In step 204, the detection processing unit 1203 checks if an image change is detected as the result of the image recognition processing in step 203. Of course, whether or not an image change is detected is determined for each monitor region. Whether or not there is an image change is determined, for example, by detecting a change in the brightness value. In this case, the occurrence of a notification error can be minimized, for example, by a establishing a predetermined threshold value for abnormality detection as necessary to prevent a change smaller than the predetermined value from being treated as abnormal.

If it is determined that there is an image change as the result of detection, control is passed to step 205; if it is determined that there is no change, control is returned to step 202 to perform the same processing for the next input image.

In step 205, the characteristics extraction unit 1204, which has received the detection result of the detection processing unit 1203 in step 204, detects the changed part of the image, that is, the detected characteristics (for example, region in which the change is detected, the size of the region, etc.) of the target. The detected characteristics information is transmitted to the monitor information generation unit 1206 and the notification destination determination unit 1207 provided in the conversion unit 1205.

In step 206, the monitor information generation unit 1206, which has received the characteristics or feature information from the characteristics extraction unit 1204, generates monitor information. The generated monitor information is output to the transmission unit 1209. The contents of the monitor information may be a message describing at least one of the time of day at which the image change was detected, year/month/day, the monitor camera number, the characteristics or features of the detected target, and so on. Of course, the monitor information may include, as necessary, the still image and/or the moving image of the image captured by the monitor camera when the image changed.

The message described above may be superimposed on the still images and other images captured by the monitor camera. It is also possible to change the size, that is, the number of pixels or compression rate, of the image depending upon the size of data receivable by the client PC 1013 or the capacity of the communication line so that the user can receive the data.

In step 207, the notification destination determination unit 1207 selects the notification destination of the monitor information. The notification destination determination unit 1207 searches the notification destination table A1208 to select the notification destination based on the characteristics information received from the characteristics extraction unit 1204. The selected notification destination is output to the transmission unit 1209. If there is no notification destination, no destination is output to the transmission unit 1209.

In step 208, the transmission unit 1209 transmits the monitor information to the portable terminal 1012 and the client PC 1013. That is, the monitor information, generated by the monitor information generation unit 1206, is transmitted to the notification destination selected by the notification destination determination unit 1207. The monitor information is transmitted usually via electronic mail; or any method other than an electronic mail may also be used if the portable terminal 1012 and the client PC 1013 can receive the monitor information. In step 209, the monitor processing ends.

As described above, the notification apparatus 1007 in this embodiment allows a plurality of monitor regions to be set in an image area picked up by the monitor camera and to transmit the monitor information according to the detection result in the monitor regions. Setting a plurality of monitor areas in this way gives more detailed detection information about an area picked up by the monitor camera and allows monitor information to be transmitted to a notification destination where the monitor information is needed. At the same time, this apparatus performs image recognition processing more quickly than when the whole area of the image is processed and reduces the memory amount required for image recognition processing.

In the above embodiment, one or more parts of the image area are established in advance as monitor regions, and information is transmitted to a predetermined notification destination when an image change, that is, a target, is detected in the monitor regions. Another method is also possible in which image recognition processing is performed for the whole image area, the position of a target is determined from the center of gravity of the detected target, a corresponding notification destination is selected from the notification destination table based on the position, and the notification destination of the monitor information is switched.

Note that the processing steps in FIG. 12 described above are exemplary. In actual monitor scenes, the function of the notification apparatus is implemented, of course, by adaptively changing the processing steps according to a monitor target and so on.

Next, a notification apparatus in another embodiment of the present invention will be described with reference to FIG. 1–FIG. 4. Note that the configuration of the notification apparatus is the same as that shown in FIG. 9.

FIG. 1 is an example of an image captured by a monitor camera installed in front of the front gate of a building for monitoring the front gate. The numeral 101 indicates the whole area of the image captured by the monitor camera. The following describes how to monitor the place where there is a building, called the first building, ahead of the arrow in the top of the figure and there is a restricted zone ahead of the arrow to the right side. The numeral 102 indicates a monitor region (1) established in the road from the front gate to the first building, and the numeral 103 indicates a monitor region (2) established in the road from the front gate to the restricted zone. The numeral 104 indicates a person entering at the front gate.

In this example, image recognition processing is performed to detect to which place, either the first building or the restricted zone, the person entering at the front gate is going. When the person is going to the first building, the monitor information is transmitted to the front desk of the first building; when the person is going to the restricted zone, the monitor information is transmitted to the guardroom.

FIG. 2 shows an example of a monitor region set for the image captured by the monitor camera in FIG. 1. In FIG. 2, the image in FIG. 1 is divided into 16×12 blocks. A block indicated by “1” is a block included in the monitor region (1), and a block indicated by “2” is a block included in the monitor region (2).

A blank block indicates a block for which no image recognition processing is performed. In this example, when the person 104 intrudes into the monitor region (1) 102, the blocks indicated by “1” enters the detection state. Similarly, when the person 104 intrudes into the monitor region (2) 103, the blocks indicated by “2” enters the detection state.

A monitor region is set by the operator of the browser PC 1005, for example, using the pointing device 1109 such as a mouse provided on the browser PC 1005. More specifically, a desired monitor region can be set by specifying the range by clicking the blocks with the mouse or by performing the drag & drop operation with the mouse. The monitor region (1) and the monitor region (2), which are set, are stored respectively in the memory 1201-1 and the memory 1201-2, shown in FIG. 9, as the region tables.

FIG. 3 is a diagram showing an example of the contents of the notification destination table A1208 used for specifying the notification destinations of the monitor information according to the monitor regions in which a moving object is detected. In this table, the notification destinations corresponding to the monitor regions are set. In the example shown in FIG. 1, the notification destination of the monitor information in region 1 is the front desk of the first building, and the notification destination of the monitor information in region 2 is the guardroom.

The notification destination is specified by a mail address when monitor information is transmitted via an electronic mail, and a telephone number when a telephone call is used. Any other notification means and form may also be used as long as the place, to which the monitor information is to be transmitted, is specified by identifiable information. In this way, the notification destinations of the monitor information are set in advance in the notification destination table A1208 when the monitoring system is installed. It is also possible to set the notification destination table A1208 from the browser PC 1005, portable terminal 1012, or client PC 1013 after installing the monitoring system.

Figure 4:
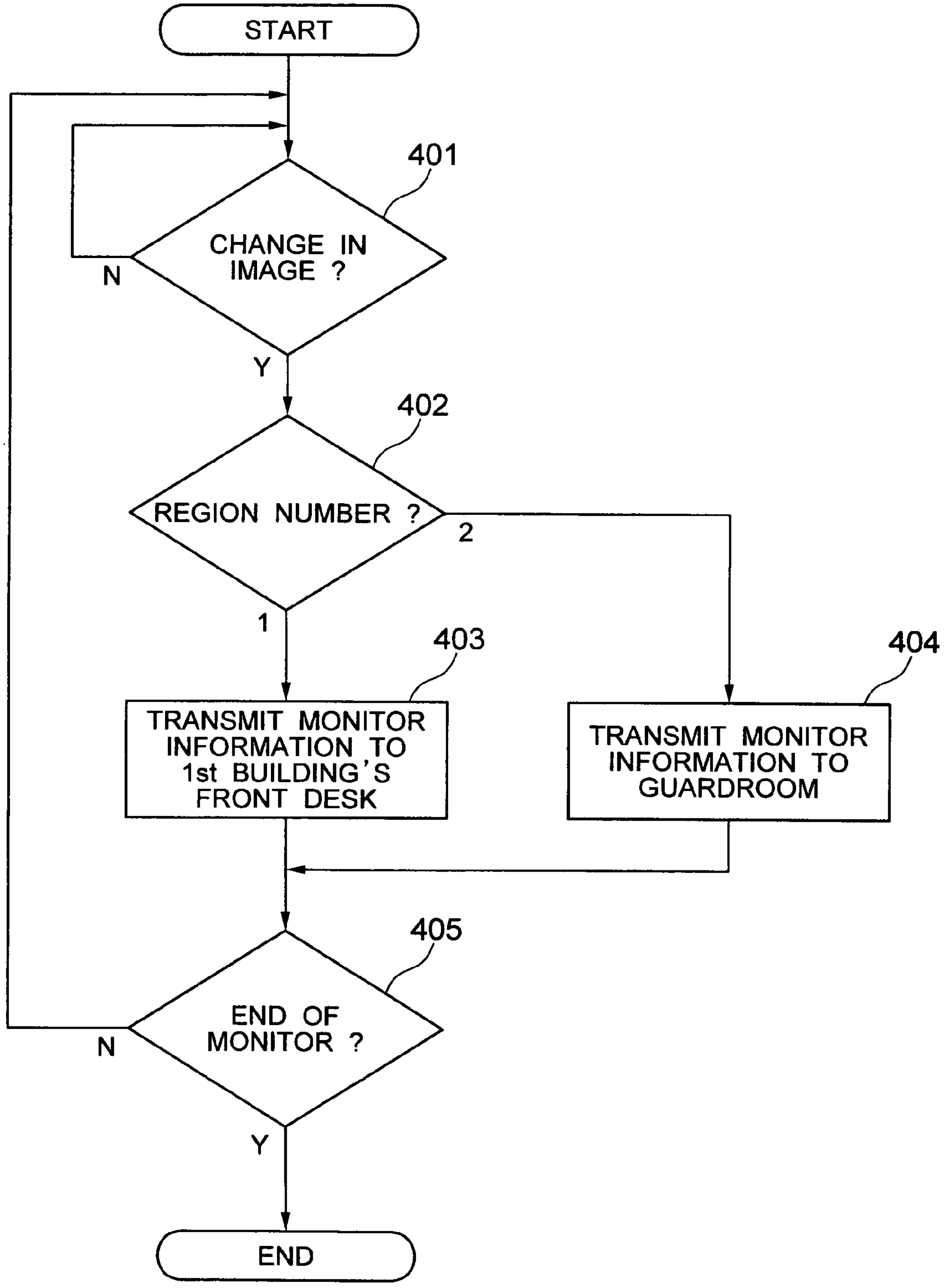
FIG. 4 is a flowchart showing a method for selecting the notification destination of monitor information in one embodiment of the present invention.

The following describes an example of processing with reference to the flowchart in FIG. 4 in which a moving object is detected through image recognition as shown in the figures in FIG. 1 to FIG. 3 and the notification destination of the monitor information is selected according to the region in which the moving object is detected.

In step 401, the detection processing unit 1203 (FIG. 9) detects an image change through image recognition processing to check if there is an image change. Control is passed to step 402 if an image change is detected, and to step 401 to repeat the processing of that step if an image change is not detected.

In step 402, the characteristics extraction unit 1204 determines the number of the region in which the image change was detected. In the example in FIG. 1, control is passed to step 403 if the image change was detected in the monitor region (1) 102, and to step 404 if the image change was detected in the monitor region (2) 103.

When, for example, an image change was detected by the image recognition processing unit 1203-1, the characteristics extraction unit 1204 can determine the region number such that the image change was detected in the monitor region (1). It is of course possible to use a method other than this to determine the region in which an image change was detected.

In step 403, the conversion unit 1205 generates monitor information if the image change was detected in the monitor region (1), references the notification destination table A1208 shown in FIG. 3, acquires the notification destination of the monitor information corresponding to the monitor region (1), and transmits the monitor information. In this example, the monitor information is transmitted to the front desk of the first building.

In step 404, the conversion unit 1205 generates monitor information if the image change was detected in the monitor region (2), references the table in FIG. 3, acquires the notification destination of the monitor information corresponding to the monitor region (2), and transmits the monitor information as in step 403. In this example, the monitor information is transmitted to the guardroom.

In step 405, whether or not the monitor processing is to be continued or ended is judged. The CPU of the notification apparatus judges whether to continue or end the monitor processing, for example, based on whether the monitor end instruction is received from the user or based on the table (not shown) in which the operation schedule of the notification apparatus is stored. Control is passed to step 401 if the monitor processing is to be continued as the result of the judgment in step 405. If the monitor processing is to be ended as the result of the judgment, the monitor processing is ended.

The judgment in step 405 for judging if the monitor processing is to be continued or ended may be made for each monitor region or for each notification destination. For example, for the front desk of the first building that is the notification destination of the monitor region (1), the monitor information is not transmitted or image processing is not performed for the monitor region (1) when the first building is closed because it is out of the business hours. On the other hand, because the guardsmen are in the guardroom that is the notification destination of the monitor region (2) on a round-the-clock basis, the monitor information is transmitted to, and the image processing is performed for, the monitor region (2) continuously.

Similarly, in step 403 and step 404, it is also possible to take into consideration the time at which an image change was detected. FIG. 15 shows an embodiment of a notification table in which a time at which an image change is detected is related to the notification destination of the monitor information. FIG. 15A shows a notification destination table set up for the monitor region (1), while FIG. 15B shows a notification destination table set up for the monitor region (2). In FIGS. 15A and 15B, the times at which the image change is detected and the notification destinations of the monitor information are set.

In the example shown in FIG. 15A, the monitor information is transmitted to the front desk of the first building when an image change is detected during the business hours, 9:00–17:00, of the first building. An image change detected out of business hours is not transmitted. Of course, for an image change detected out of business hours, the monitor information may be transmitted to a place other than the front desk of the first building.

In the example shown in FIG. 15B, because the guardsmen are in the guardroom that is the notification destination of the monitor region (2) on a round-the-clock basis, the monitor information is always transmitted to the guardroom when an image change is detected.

If an image change is detected in a monitor region when a plurality of monitor regions are set up in advance for an image to be captured by a monitor camera according to the method described above, the notification destination of the monitor information can be switched on a monitor region basis.

Because a plurality of monitor regions are provided for the image processing of the notification apparatus, the same effect as that of a plurality of cameras is achieved by one camera. This enables the notification apparatus to give more detailed monitor information and to transmit the monitor information to the notification destinations according to the need.

Next, a notification apparatus in a still another embodiment of the present invention will be described with reference to FIGS. 5A–5B, FIG. 6, and FIG. 13.

In this example, the image captured by the monitor camera shown in FIG. 1 is used, and the notification apparatus not only performs the processing of the embodiment described above but also judges the size of a detected object. More specifically, the notification apparatus adds up the number of blocks in which an image change occurred in the monitor region (1) or in the monitor region (2) and, if the total is equal to or larger than, or smaller than, a predetermined number, the notification apparatus transmits the monitor information assuming that the blocks belong to the detected object.

Figure 13:
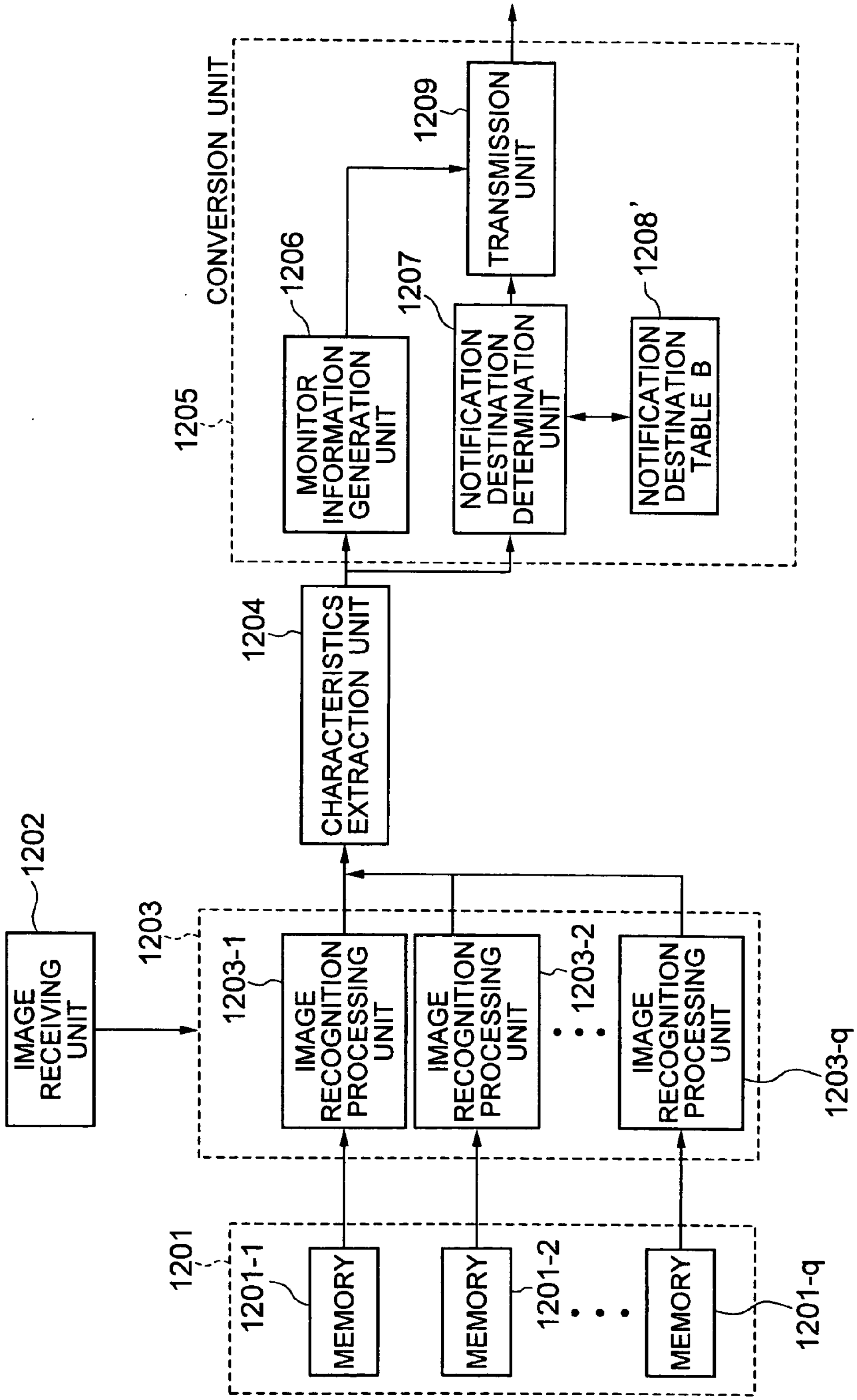
FIG. 13 is a block diagram showing the basic configuration of the notification apparatus in one embodiment of the present invention for use with the method for selecting a notification destination described with reference to FIGS. 5A, 5B, and 6.

FIG. 13 is a block diagram showing the basic configuration of the notification apparatus in this embodiment. The same numerals are attached to the same components in FIG. 9. This block diagram is similar to that shown in FIG. 9 except a notification destination table B1208' and, therefore, the description is omitted here.

FIGS. 5A and 5B show an embodiment of the notification destination table B1208' which associates the total number of blocks where an image change occurred with a notification destination of the monitor information. FIG. 5A is a notification destination table for the monitor region (1), and FIG. 5B is a notification destination table for the monitor region (2). The number of blocks where an image change is detected and the notification destination of the monitor information are set respectively in FIG. 5A and FIG. 5B.

In the example shown in FIG. 5A, an object having the size of six or more blocks but less than 12 blocks is judged as a person 104 and the monitor information is transmitted to the front desk of the first building. An object having the size of 12 or more blocks is judged as a car, and the monitor information is transmitted to a car park attendant of the first building. If the number of blocks where an image change occurred is less than six, no monitor information is transmitted. An object detected by less than six blocks is, for example, a small animal other than a person. The number of alarms generated by an erroneous notification can be reduced by not transmitting the monitor information in this way when the number of blocks is less than six.

In the example shown in FIG. 5B, the table is configured such that the monitor information is transmitted to the guardroom for all objects having the size of six or more blocks and that no monitor information is transmitted when the number of blocks where an image change occurred is less than six. It will be easily understood that the contents of the notification destination table B1208' can be changed as necessary.

Figure 6:
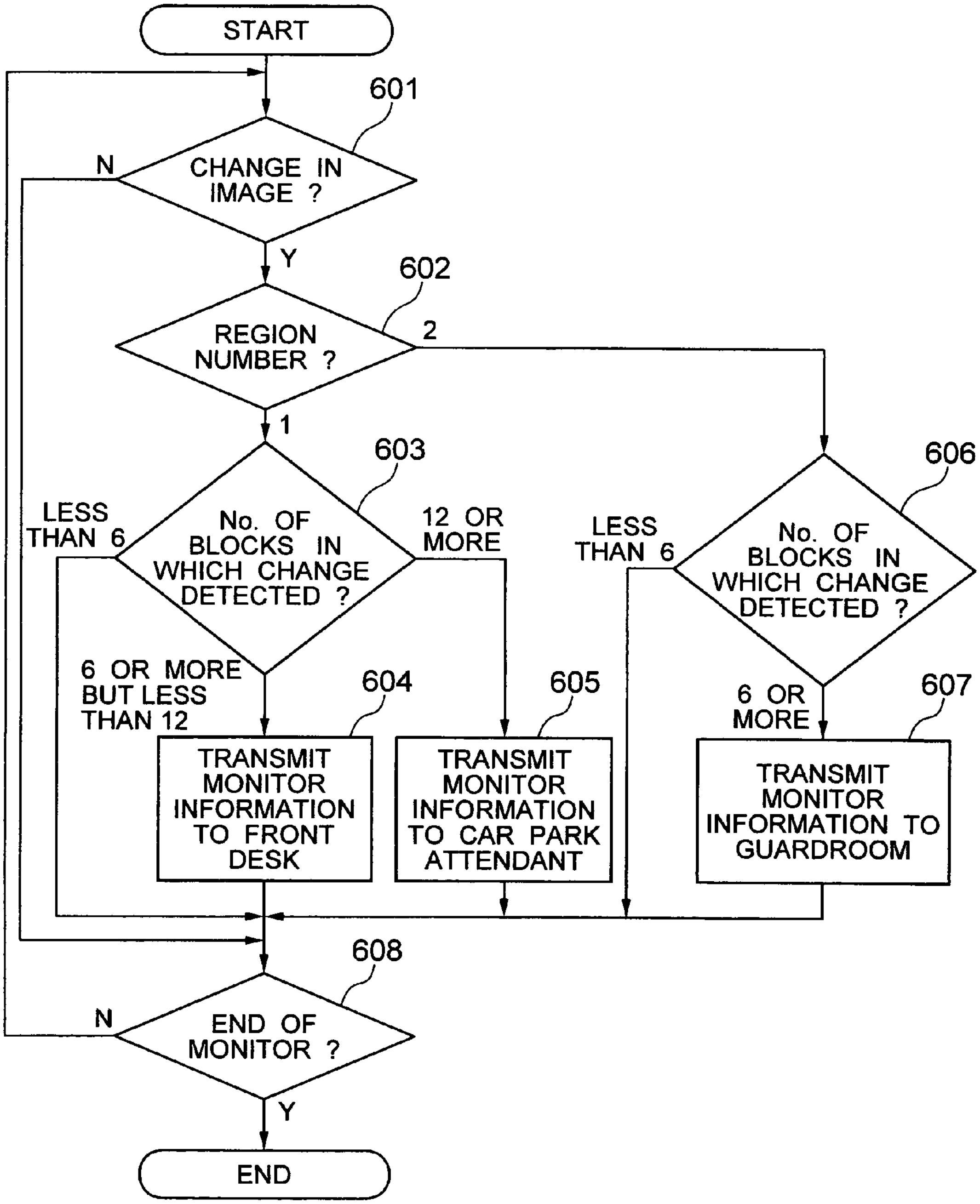
FIG. 6 is a flowchart showing a method for selecting the notification destination of monitor information using the notification destination tables in FIGS. 5A and 5B.

FIG. 6 is a flowchart showing the processing flow of this embodiment.

In step 601, the detection processing unit 1203 determines if there is an image change in the monitor region (1) 102 or the monitor region (2) 103. Control is passed to step 602 if an image change is detected; otherwise, control is passed to step 608.

In step 602, the characteristics extraction unit 1204 determines the number of the region in which the image change was detected. Control is passed to step 603 if the image change was detected in the monitor region (1), and to step 606 if the image change was detected in the monitor region (2).

In step 603, the characteristics extraction unit 1204 determines the number of blocks in which the image change was detected. Control is passed to step 608 if the number of blocks in which the image change was detected is less than six, to step 604 if the number of blocks is six or more but less than 12, and to step 605 if the number of blocks is 12 or more.

In step 604, the conversion unit 1205 generates monitor information, acquires the notification destination of the monitor information corresponding to six or more but less than 12 blocks, in which the image change was detected, from the notification destination table for the monitor region (1) shown in FIG. 5A, and transmits the monitor information to the corresponding notification destination. In this example, the monitor information is transmitted to the front desk of the first building.

In step 605, the conversion unit 1205 generates monitor information, acquires the notification destination of the monitor information corresponding to 12 or more blocks, in which the image change was detected, from the notification destination table for the monitor region (1) shown in FIG. 5A, and transmits the monitor information to the corresponding notification destination. In this example, the monitor information is transmitted to the car park attendant in the first building.

In step 606, the characteristics extraction unit 1204 determines the number of blocks in which the image change was detected as in step 603. Control is passed to step 608 if the number of blocks in which the image change was detected is less than six, and to step 607 if the number of blocks is six or more.

In step 607, the conversion unit 1205 generates monitor information, acquires the notification destination of the monitor information corresponding to six or more blocks, in which the image change was detected, from the notification destination table for the monitor region (2) shown in FIG. 5B, and transmits the monitor information to the corresponding notification destination. In this example, the monitor information is transmitted to the guardroom.

In step 608, the conversion unit 1205 determines whether or not the monitor processing is to be continued or ended. Control is passed to step 601 if the monitor processing is continued.

The method described above allows the notification apparatus to determine the type of a moving object based on the number of blocks in which an image change was detected, that is, based on the size of the moving object, and to switch the notification destination of the monitor information according to the type of the moving object.

Although a plurality of monitor regions are set in the description of this embodiment, the same processing may also be applied, of course, when only one monitor region is set for an image captured by the monitor camera or when the whole area of an image captured by the monitor camera is used as one monitor region.

In the two embodiments described above, the notification destination of monitor information can be switched when an image change is detected in the monitor region (1) or the monitor region (2). However, it is impossible to determine to which location a person detected in the monitor region (1) is going; from the front gate to the first building or, conversely, from the first building to the front gate.

That is, when a person detected in the monitor region (1) is going from the first building to the front gate, there is no need to transmit the monitor information to the front of the first building and it is required to eliminate such an unnecessary transmission. The next embodiment, which satisfies this need, will be described with reference to FIG. 7, FIG. 8, and FIG. 14.

Figure 14:
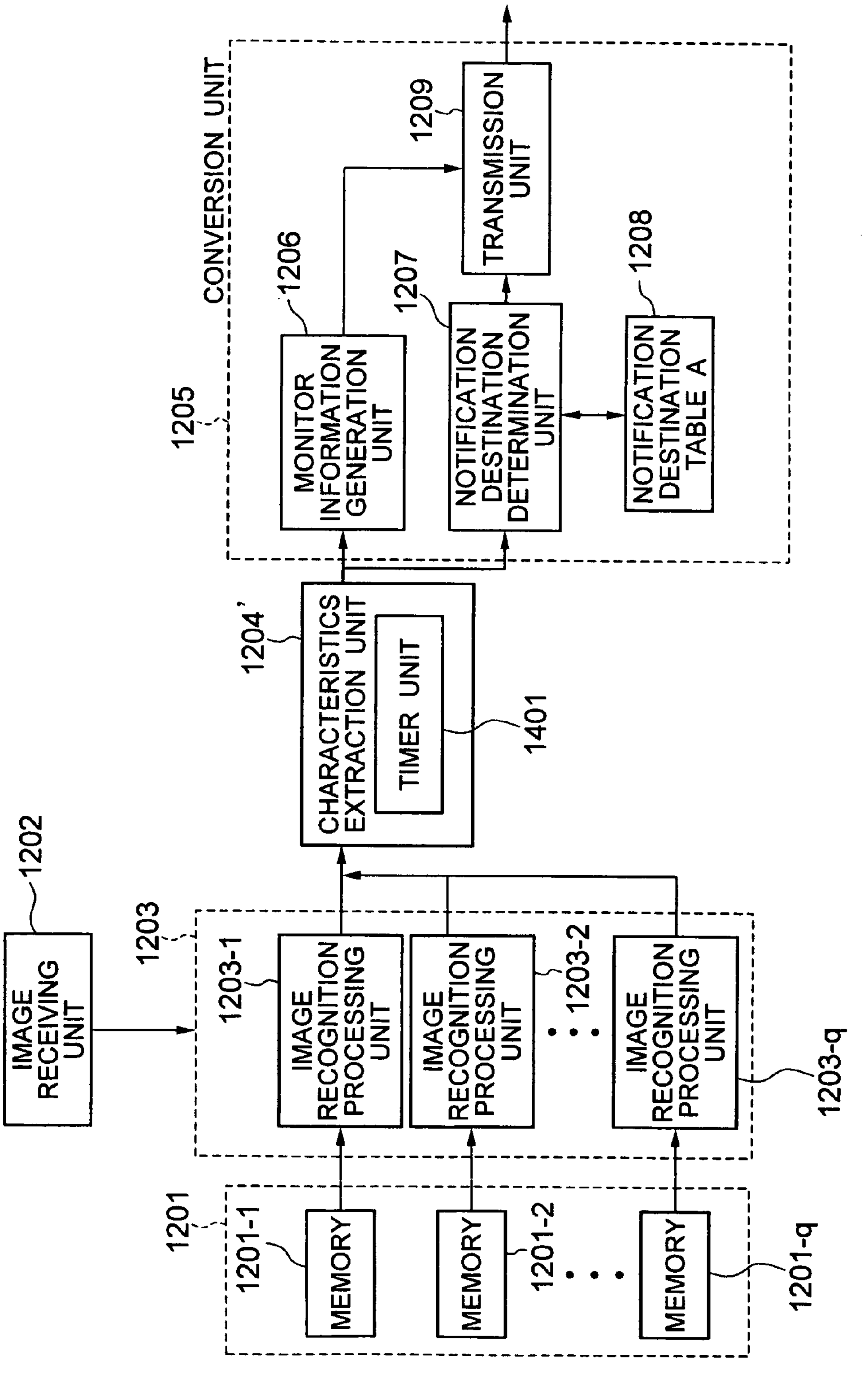
FIG. 14 is a diagram showing the basic configuration of the notification apparatus in one embodiment of the present invention for use with the method for selecting the notification destination described with reference to FIGS. 7 and 8.

FIG. 14 is a block diagram showing the detailed configuration of a notification apparatus in this embodiment. The same numerals are attached to the same components in FIG. 9. This block diagram is similar to that shown in FIG. 9 except a characteristics extraction unit 1204' and, therefore, the description is omitted here.

The characteristics extraction unit 1204' has a timer unit 1401 that measures the elapsed time. In this embodiment, simple processing is performed using the time history of a monitor region, in which a moving object is detected, to trace the moving direction of a moving object and to reduce unnecessary transmissions. This embodiment will be described below more in detail.

Figure 7:
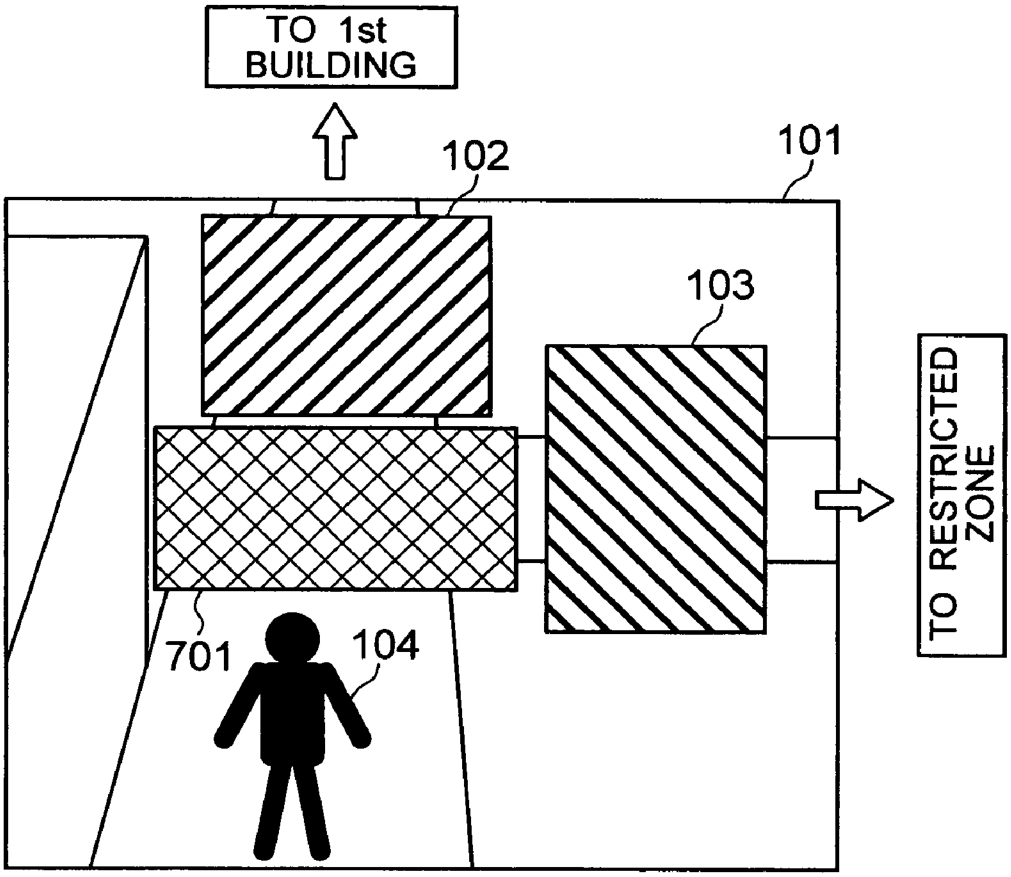
FIG. 7 is a diagram showing an example of an image, captured by a monitor camera, used to describe the method for selecting the notification destination of monitor information in another embodiment of the present invention.

FIG. 7 is similar to FIG. 1 except that a monitor region (3) 701 is newly added. In FIG. 7, a person going from the front gate to the first building is detected in the monitor region (3) 701 and then in the monitor region (1) 102. Conversely, a person going from the first building to the front gate is detected in the monitor region (1) 102 and then in the monitor region (3) 701. Therefore, it is possible to judge where the detected person is going by determining the order of the regions in which the person is detected. This allows the notification apparatus to transmit more accurate monitor information.

Similarly, a person going from the front gate to the restricted zone is detected in the monitor region (3) 701 and then in the monitor region (2) 103, and a person going from the restricted zone to the front gate is detected in the monitor region (2) 103 and then in the monitor region (3) 701.

In the example in FIG. 7, a person going from the first building to the restricted zone is detected first in the monitor region (1) 102 and then in the monitor region (3) 701 and, after that, in the monitor region (2) 103. A person going from the restricted zone to the first building is also detected first in the monitor region (2) 103, then in the monitor region (3) 701 and, after that, in the monitor region (1) 102.

That is, both a person going from the front gate to the first building and a person going from the restricted zone to the first building are detected in the monitor region (3) 701 and then in the monitor region (1) 102. This applies to other places.

Figure 8:
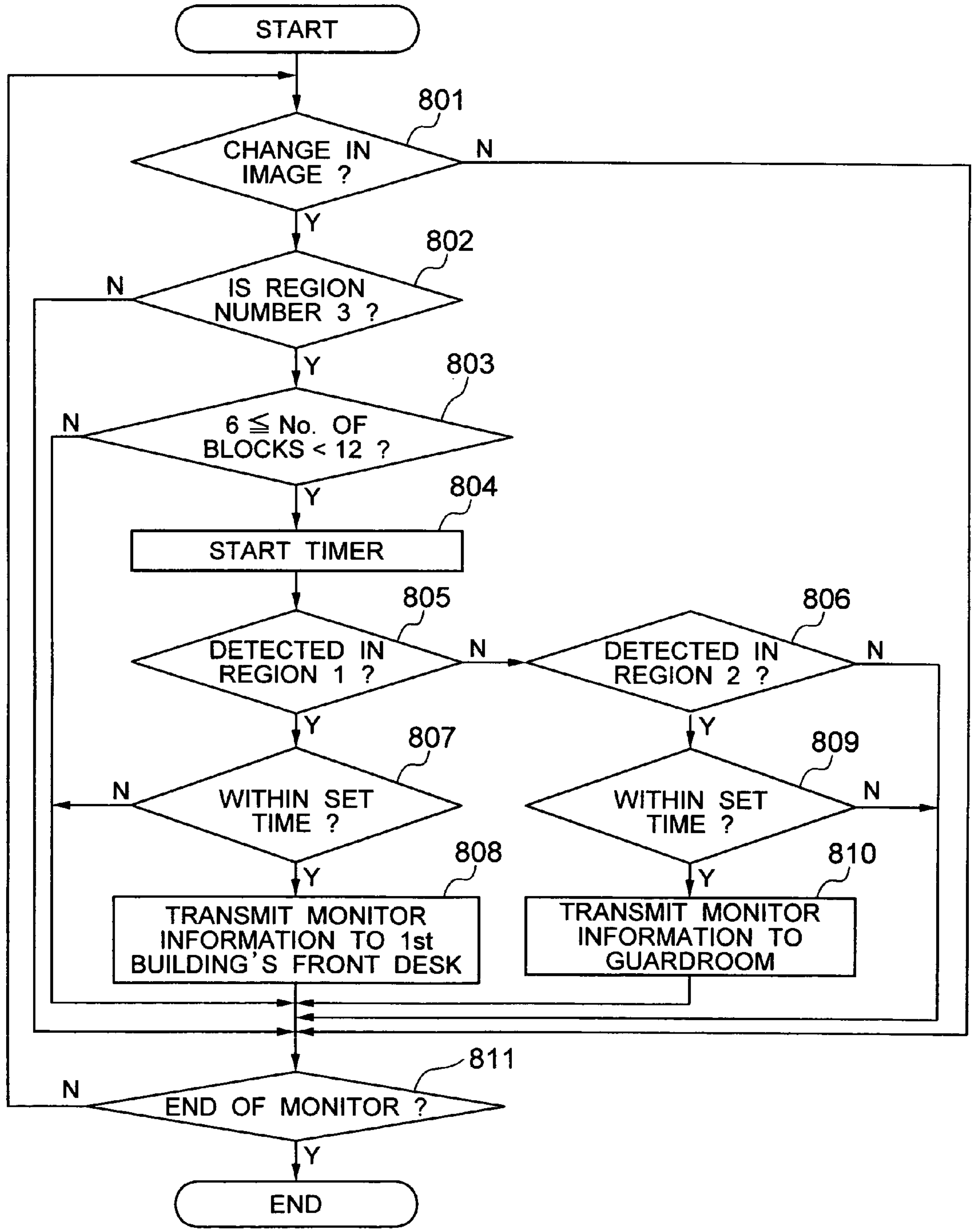
FIG. 8 is a flowchart showing the method for selecting monitor information in the embodiment of the present invention described by referring to the image captured by a monitor camera shown in FIG. 7.

Next, the processing flow of this embodiment will be described with reference to the flowchart shown in FIG. 8. In FIG. 8, the example assumes that monitor information is transmitted only when the total number of blocks, in which an image change described in the above embodiment is detected, is six or more but less than 12, that is, when a person is detected. The example also assumes that the monitor information is transmitted only when the detected person goes to the first building or to the restricted zone but not when the person goes to the front gate.

In step 801, the detection processing unit 1203 detects if there is an image change. Control is passed to step 802 when there is a change, and to step 811 when there is no change.

In step 802, the characteristics extraction unit 1204' determines if the region in which the image change was detected is the monitor region (3) 701. Control is passed to step 803 if the region is the monitor region (3); otherwise, control is passed to step 811. This is because, when the person goes to the first building or to the restricted area, the person is detected first in the monitor region (3) 701. As described above, when the person goes from the first building to the restricted zone, the person is detected first in the monitor region (3) 701.

In step 803, the characteristics extraction unit 1204' determines the number of blocks in which the image change was detected. Control is passed to step 804 if the number of detected blocks is six or more but less than 12, that is, if the person 104 is detected. Otherwise, control is passed to step 811.

In step 804, the measurement of the elapsed time since the person is detected in monitor region (3) 701 is started. The characteristics extraction unit 1204' resets the timer unit 1401 to determine the elapsed time and newly starts measuring the elapsed time.

In step 805, the characteristics extraction unit 1204' determines if the person 104 is detected in the monitor region (1). Control is passed to step 807 if the person is detected in monitor region (1); otherwise, control is passed to step 806.

Step 805 is executed when the detection processing unit 1203 detects an image change by processing (not shown for brevity) executed on the image sent from the image receiving unit 1202 after step 804. In the description below, processing, which is required after step 805 and step 806, for determining the number of blocks, in which the image change was detected, is also omitted.

In step 806, the characteristics extraction unit 1204' determines if the person 104 was detected in the monitor region (2). If the person 104 was detected in the monitor region (2), control is passed to step 809; otherwise, control is passed to step 810.

In step 807, the characteristics extraction unit 1204' determines the elapsed time from the time when the image change was detected in the monitor region (3) to the time when the image change was detected in the monitor region (1). The characteristics extraction unit 1204' reads the current elapsed time from the timer unit 1401. Control is passed to step 808 if the elapsed time is within a predetermined set time; otherwise control is passed to step 811.

In step 808, the conversion unit 1205 generates monitor information, acquires the notification destination of the monitor information, which is to be transmitted when an image change is detected in the monitor region (1), from the notification destination table A1208 shown in FIG. 3, and transmits the monitor information. In this example, the monitor information is transmitted to the front desk of the first building.

In step 809, the characteristics extraction unit 1204' determines the elapsed time from the time the image change was detected in the monitor region (3) to the time when the image change was detected in the monitor region (2). As in step 807 described above, the characteristics extraction unit 1204' reads the current elapsed time from the timer unit 1401. Control is passed to step 810 if the elapsed time is within a predetermined set time; otherwise control is passed to step 811.

The set time used in the determination in step 809 may be different from that used in step 807. For example, the time used in the determination in step 807 or step 809 is defined in advance according to the distance from the monitor region (3). In addition, the elapsed time need not be measured using the timer unit 1401; instead, the elapsed time may be determined by recording the time at which the image change was detected in each monitor region. In that case, detection history information, composed of the number of the monitor region in which an abnormality was detected and information such as an abnormality detection time, is stored in the memory of the notification apparatus.

In step 810, the conversion unit 1205 generates monitor information, acquires the notification destination of the monitor information, which is to be transmitted when an image change is detected in the monitor region (2), from the notification destination table A1208 shown in FIG. 3, and transmits the monitor information. In this example, the monitor information is transmitted to the guardroom.

In step 811, whether the monitor processing is to be continued or ended is determined. When the monitor processing is continued, control is passed to step 801.

According to the method described above, sophisticated processing is possible in which the moving direction is determined by the time history of the monitor region where a moving object is detected and in which, depending upon the moving direction of the moving object, either the notification destination of the monitor information is switched or monitor information is not transmitted. That is, from the moving direction, it is possible to predict in which destination the moving object is moving.

In step 807 and step 809 described above, the detection interval is determined. For example, when a person goes from the front gate directly to the first building, the time required from the monitor region (3) to the monitor region (1) is short. On the other hand, when a person takes a walk from the front gate to the first building and does not have something to do in the first building, the time required from the monitor region (3) to the monitor region (1) is long and the detection interval is long. Therefore, the notification apparatus determines not only the moving direction but also the detection interval, thus transmitting only the needed monitor information to the notification destination and reducing unnecessary transmissions.

Note that the monitor information may be, of course, transmitted when a target is detected in the monitor region (1) or in the monitor region (2) after detecting the target in the monitor region (3) without determining the detection interval. Again, in this case, the transmission frequency of the monitor information can be reduced as compared when the monitor information must always be transmitted upon detecting it in one of the monitor regions.

In this embodiment, the moving direction of a moving object can be determined without using the known trace processing technologies that are complex, such as template matching, but can be determined through simple processing in which the time history of the monitor region, where the moving object is detected, is used. This reduces the load of the CPU in the notification apparatus. Of course, it is also possible to combine the conventional known image recognition technology with the trace processing technology to identify an object, to trace the identified object more accurately, and to determine the moving direction and destination so that unnecessary transmissions can be reduced and the monitor information can be transmitted to a notification destination where the monitor information is needed.

It is also possible to transmit preliminary alarm information to a predetermined notification destination as a temporary alarm when a moving object is detected in one of the monitor region (1) 102, monitor region (2) 103, and monitor region (3) 701.

In the above embodiments, image processing is performed for a monitor region, which is set in a part of the whole area of an image, to detect an intruding object. It is also possible to perform image processing for the whole area of an image and, when an object is detected, transmit low-level preliminary monitor information to a predetermined notification destination as a temporary alarm. In this case, the load of the notification apparatus, such as the memory capacity and the CPU, is increased because image processing is performed also for the whole area of the image. However, detection through image processing is also performed for each monitor region separately and, therefore, coarse detection processing using large pixel blocks may be performed as the image processing for the whole area.

The characteristics extraction unit can detect not only the characteristics or features of an object as described in the above embodiments but also the color of the object, the moving speed of the object, and so on to switch the destination of the monitor information. Similarly, the notification destination of the monitor information may also be switched according to the time zone in which the object is detected.

As described above, monitor information can be transmitted to different notification destinations according to the location where a moving object is detected or the size of the moving object in the above embodiments.

The application of the present invention is not limited to the field described above but includes various fields. For example, the present invention can be applied to a field other than monitoring.

While the embodiments have been described above, it is to be understood that the present invention is not limited to those embodiments but that various modifications and changes will be apparent to those skilled in the art without departing the spirit and the scope of the appended claims.

What is claimed is:

1. A change detecting apparatus comprising:

an input unit that receives a monitor image picked up by a pickup unit;

a region specification unit that specifies N regions (N is a positive integer equal to or larger than 2) in the monitor image;

a notification destination specification unit that specifies notification destinations of image changes in the monitor image in advance according to characteristics or features of the image changes;

a change detection unit that detects an image change in the N regions;

a characteristics extraction unit that extracts at least one characteristic or feature of the image changes from said change detection unit;

a monitor information generation unit that generates monitor information related to each of the detected image changes; and a transmission unit that transmits the monitor information, wherein said transmission unit transmits the monitor information to a predetermined notification destination, which is set in said notification destination specification unit, based on the detected characteristics or features of the image change.

2. The change detecting apparatus according to claim 1, wherein the characteristics or features extracted by said characteristics extraction unit include identification information on a region in which an image change was detected and monitor information related to the image change is transmitted to a predetermined notification destination based on the identification information.

3. The change detecting apparatus according to claim 2, wherein the characteristics or features extracted by said characteristics extraction unit further include size information on a region, in which the image change was detected, in addition to the identification information on the region and monitor information related to the image change is transmitted to a predetermined notification destination based on the identification information and the size information on the region.

4. The change detecting apparatus according to claim 1, wherein the characteristics or features extracted by said characteristics extraction unit include a moving direction of the image change in the monitor image and monitor information related to the image change is transmitted to a predetermined notification destination based on the moving direction of the image change.

5. The change detecting apparatus according to claim 1, wherein the characteristics or features of the image change extracted by said characteristics extraction unit include an order characteristic indicating whether or not the image change was detected in predetermined two regions out of the N regions in a predetermined order, and wherein said transmission unit transmits monitor information to a predetermined notification destination that is set in said notification destination specification unit based on the characteristics or features.

6. The change detecting apparatus according to claim 5, wherein the characteristics or features of the image change extracted by said characteristics extraction unit further include a time characteristic indicating whether or not the image change was detected in the two predetermined regions within a predetermined time in addition to the order characteristic, and wherein said transmission unit transmits the monitor information to a predetermined notification destination based on the order characteristic and the time characteristic.

7. The change detecting apparatus according to claim 2, wherein the characteristics or features extracted by said characteristics extraction unit further includes a generation time of the image change and information related to the image change is transmitted to the predetermined notification destination based on the generation time and the identification information.

8. A monitoring system comprising:

a video signal input unit;

an encoder that converts a video signal received from said video signal input unit into digital image data;

an image accumulation unit that has a function of accumulating the digital image data received from said encoder;

a notification apparatus that reads an image accumulated in said image accumulation unit and detects an image change; and a transmission path and a hub that interconnect said video signal input unit, said encoder, said image accumulation unit, and said notification apparatus, wherein said notification apparatus includes a monitor information generation unit that generates monitor information related to a detected image change and a notification destination determination unit that determines a transmission destination of the monitor information.

9. The monitoring system according to claim 8, wherein characteristics or features of the image change at least include a position of the image change in the digital image data and said notification apparatus determines a notification destination to which the monitor information is to be transmitted based on the position of the image change.

10. The monitoring system according to claim 9, wherein the characteristics or features of the image change further include a size of a region of the image change in addition to the position of the image change and a notification destination to which the monitor information is to be transmitted is determined based on the position of the image change and the size of the image change.

11. The monitoring system according to claim 9, wherein the characteristics or features of the image change further include a generation time of the image change and said notification apparatus determines a notification destination to which the monitor information is to be transmitted based on the generation time of the image change and the position of the image change.

12. A change detecting method comprising the steps of:

setting N monitor regions (N is an integer equal to or larger than 2) in a pickup range of a camera in advance;

creating, in advance, a notification destination table in which notification destinations of image changes in an image from the camera are set according to characteristics of the image changes;

reading an image from an image accumulation unit, in which images from said camera are accumulated, detecting an image change in the image that has been read;

extracting characteristics or features of the detected image change;

creating monitor information related to the detected image change; and transmitting the monitor information to a predetermined notification destination based on the extracted characteristics features.

13. The change detecting method according to claim 12, wherein the extracted characteristics or features of the image change includes a monitor region in which the image change was generated and the monitor information is transmitted to a predetermined notification destination based on the monitor region in which the image change was generated.

14. The change detecting method according to claim 13, wherein the extracted characteristics or features of the image change further include a size of a region of the image change in addition to the monitor region in which the image change was generated and the monitor information is transmitted to a predetermined notification destination based on the monitor region and the size.

15. The change detecting method according to claim 12, wherein the extracted characteristics or features of the image change include a moving direction of the image change and the monitor information related to the image change is transmitted to a predetermined notification destination based on the moving direction of the image change.

16. The change detecting method according to claim 12, wherein the extracted characteristics of the image change include an order characteristic indicating whether or not the image change was detected in predetermined two regions out of the N regions in a predetermined order, and wherein the monitor information is transmitted to a predetermined notification destination based on the order characteristics.

17. The change detecting method according to claim 16, wherein the extracted characteristics or features of the image change further include a time characteristic indicating whether or not the image change was detected in the two predetermined regions within a predetermined time in addition to the order characteristic, and wherein the monitor information is transmitted to a predetermined notification destination based on the order characteristic and the time characteristic.

18. The change detecting method according to claim 13, wherein the extracted characteristics or features of the image change further include a generation time of the image change and the monitor information is transmitted to the predetermined notification destination based on the generation time and the monitor region.

* * * * *